United States Patent
Hyder et al.

(10) Patent No.: US 6,233,624 B1
(45) Date of Patent: May 15, 2001

(54) SYSTEM AND METHOD FOR LAYERING DRIVERS

(75) Inventors: Jameel Hyder, Redmond; Kyle Brandon, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/852,946

(22) Filed: May 8, 1997

(51) Int. Cl.[7] ........................................... G06F 9/40
(52) U.S. Cl. ............................................... 709/327
(58) Field of Search .................. 371/681; 713/1; 709/321, 327, 323

(56) References Cited

U.S. PATENT DOCUMENTS

| | | | | |
|---|---|---|---|---|
| 5,457,798 | * | 10/1995 | Alfredsson | 395/700 |
| 5,613,123 | * | 3/1997 | Tsang et al. | 713/1 |
| 5,701,483 | * | 12/1997 | Pun | 395/681 |
| 5,745,761 | * | 4/1998 | Celi, Jr. et al. | 395/681 |
| 5,761,680 | * | 6/1998 | Cohen et al. | 707/206 |

OTHER PUBLICATIONS

Michael W. Garwood, et al, Unix Streams: If Modularity and Portability Are Part of Your Unix Problems, Dr. Dobb's Journal of Software Tools, vol. 14; No. 1; p. 50 (Jan. 1989).

Brian Ramsey, Streamlining Protocols for Networks, Electronic Engineering Times, Embedded Systems, p. 80, part 3:networks (Jun. 5, 1995).

Tom Williams, Unix–Style Communications for Embedded Systems; Metasphere's Embedded Streams Software; Product Announcement, Computer Design, vol. 31; No. 10; p. 140 (Oct. 1992).

Michael Day, Unix Breakthroughs Create LAN Products, LAN Times, vol. 8; No. 3; p. 69 (Feb. 4, 1991).

Jim Carr, for Unix Users: NSF and RFS Provide File Access Across Networks; Unix Local Area Networks; Network File System, Remote File Sharing; Includes Related Article on Sun's Guide to Who Is Selling OCN/NFS, The Local Area Network Magazine, vol. 5; No. 2; p. 76 (Feb. 1990).

Eric Hindin, Unix System V Version with Interface Between Applications and Networks Has Users Talking; Computer Network Protocols; Connectivity, PC Week, vol. 4; p. C11 (Jan. 27, 1987).

* cited by examiner

*Primary Examiner*—Dung C. Dinh
(74) *Attorney, Agent, or Firm*—Workman, Nydegger & Seeley

(57) ABSTRACT

A system and method for incorporating intermediate link layer drivers into a network protocol stack is presented. The system and method utilize an abstract interface for interfacing both inputs and outputs of intermediate drivers and for providing an interface for link layer device drivers. The abstract interface provides routing of data packets through the intermediate drivers and device drivers to facilitate the desired data flow. The abstract interface facilitates reuse and portability of intermediate drivers across varying computer platforms. Layering of intermediate drivers also accommodates data flow modification with minimal impact to existing drivers.

24 Claims, 5 Drawing Sheets

SYSTEM AND METHOD FOR LAYERING DRIVERS

BACKGROUND OF THE INVENTION

1. The Field of the Invention

The present invention relates to systems and methods for layering or accommodating link layer intermediate drivers in a computer network system. More specifically, the present invention relates to systems and methods for providing a common interface through which commands and messages may be passed between layers in a network stack.

2. The Relevant Technology

Historically, computer systems have presented and processed data resident within a local system. Modern computer systems are interconnected using network technologies that enable one computer to transfer or exchange substantial amounts of data with other computers. Originally, computers were directly connected one with another and exchanged information directly across a dedicated serial or parallel channel. Modern computer systems are coupled one to another through shared network techniques. Networking techniques such as Ethernet provide addressable messaging for data exchange across a shared network. As computer systems became more sophisticated and the need to exchange larger amounts of data increased, networking techniques were established wherein substantial amounts of data were broken into smaller segments or packets for efficient transfer across a computer network. Such packetizing of data required a computer-resident software application to partition bulk data into smaller enumerated packets. Furthermore, packets were dispatched across network interconnections by employing software drivers that controlled hardware modules. Because of the increased complexity in preparing and dispatching data onto the network, networking standards were established wherein defined functions were partitioned into separate distinct layers into what has become known as the OSI network model. Although some networking applications have implemented each of the seven established layers, the majority of applications implement only selective layers when preparing bulk data for transmission across a network. Two such layers incorporated by most networking stacks include a transport layer and a link layer. A driver or software module performs the assigned functionality for a specific layer, hence, a transport layer driver carries out the functionality of the transport layer while a link layer device driver performs the assigned functionality of the link layer.

FIG. 1 represents a prior art configuration of a network protocol stack 100 having a transport layer driver 102. Transport layer driver 102 traditionally performs partitioning or packetization of bulk data into manageable sized packets required by the network. Transport layer driver 102 prepares data into properly sized data packets and dispatches such data packets to link layer device drivers 108 and 118 for presentation to hardware or physical devices 110 and 120, respectively. Link layer device drivers 108 and 118 must each be written or designed to a specified interface 104 to permit compatible transfer of data therebetween.

Link layer device drivers may perform a specific function or process or a series of functions or processes on received data prior to dispatching such data to network hardware such as physical devices 110 and 120. For example, link layer device driver 108 is comprised of a function 112 followed by a function 114. Data passing from transport layer driver 102 to the network must traverse through these functions undergoing the respective processing. Link layer device driver 118 comprises function 114 and function 122 and subject data packets traversing from transport layer driver 102 to hardware 120 are subject to the processing contained within functions 114 and 122.

Although FIG. 1 illustrates an interface 104, each device driver only interfaces with this standardized interface at an entry point while all other internal functions are encapsulated within device driver 108 and 118. That is to say, any deletion, addition or modifications of functions within a device driver requires that the link layer device driver be re-written to provided compatible entry and exit points. Furthermore, when a plurality of link layer device drivers are present within a computer system, functions within various device drivers may be redundant, as depicted by function 114, yet required by each link layer device driver for properly processing the packetized data.

An example of how difficult modification of a link layer device driver may be is evidenced by what would be required to incorporate additional functionality into link layer device driver 108. If a user desired to incorporate function 122 into link layer device driver 108, they would be required to determine the proper format leaving function 114 through which function 122 must interface. Furthermore, function 122 would need to be physically replicated within link layer device driver 108 to perform the added new functionality. Rewriting of device drivers to incorporate additional functionality becomes extremely costly and difficult and frequently obsoletes existing hardware and device drivers or causes the user to forego incorporation of the additional functionality.

Thus, what is needed is a system and method for interfacing multiple device drivers enabling a first device driver to be called to perform its corresponding functions on packet data followed by the invocation of a second driver for performing a second set of processing functions on the processed data packet.

Also, what is needed is a system and method for incorporating additional functionality into a network protocol stack without having to totally rewrite a driver within the stack, thus preserving investments in existing or legacy drivers.

SUMMARY AND OBJECTS OF THE INVENTION

The foregoing problems in the prior state of the art have been successfully overcome by the present invention, which is directed to a system and method for layering drivers within an operating system of a computer system. The current system and method can be used in virtually any computer system having external or physical devices that employ software drivers for interfacing to such external devices. The present invention comprises both methods and systems for layering link layer intermediate drivers creating a data flow from an abstract interface, providing functional support for driver operations, to a link layer device driver interfacing with a physical device.

In the present invention, a method and system for incorporating a link layer intermediate driver into a data flow path in a computer operating system is presented. A data flow path is a path of execution that is traversed through a network protocol stack. A network protocol stack defines a data flow path through which data is passed between a transport layer and a physical device interconnected to a network. A network protocol stack is comprised of a transport layer driver, one or more link layer intermediate drivers and a link layer device driver interfacing with the physical hardware or device. The link layer intermediate driver receives data and returns processed data through the abstract interface while a link layer device driver is comprised of an interface with the abstract interface and a separate interface with the physical device.

The abstract interface, in one embodiment, is comprised of a function library sometimes referred to as a wrapper which handles many of the details involved in managing synchronous and asynchronous communications across a network. The abstract interface also provides a library of functions for interfacing to the kernel mode of an operating system. Device drivers, therefore, need only perform hardware specific operations needed to manage a particular hardware or physical device. Functions within the abstract interface library implement functionality common to most device drivers such as synchronization, notification of packet arrival, and queuing of outgoing packets. In contrast, traditional drivers incorporate most of the above functionality inherently which makes such device drivers much harder to write and debug and often slower than leaner drivers written to interface and operate with an abstract interface. The abstract interface provides an interface through which one or more link layer drivers may communicate with each other.

The abstract interface defines a fully abstracted environment for facilitating link layer intermediate, device and transport driver development. For example, external functions previously required by link layer intermediate and device drivers such as registering and interception of hardware interrupts, are off-loaded and performed by the abstract interface by employing predefined abstract functions.

Link layer intermediate drivers may be layered to provide packaging of common functionality into discrete independent link layer intermediate drivers. Therefore, if a specific data flow requires more or less processing, link layer intermediate drivers may be added or removed from the data flow without requiring extensive reconstruction of a driver. For example, if a particular physical device is restricted to passing packets of half the normal size, a link layer intermediate driver may be crafted that takes existing packets, splits them, and passes them onto the next driver or onto the hardware device. The link layer intermediate driver may then be integrated into the data flow path without incurring significant perturbation to the previous network protocol stack. That is to say, a grouping of link layer intermediate drivers may perform a specific function in data processing. Also, link layer intermediate drivers may be entirely reusable and reconfigurable because of the standard interface employed in their original design. For example, a specific driver may be included within multiple data flow paths and thus replication of common drivers is not required. Additionally, the ability of inserting or removing link layer intermediate drivers or layers provides a transparent way of adding or removing features from a product without having to maintain multiple code bases for the same product. Such a "building block" approach to network protocol stack development also permits existing or legacy drivers to remain productive and viable in dynamic networking environments.

Link layer intermediate drivers may also be used to separate hardware specific operations from more general management issues. For example, link layer intermediate drivers may perform more general management functions or operations while a device driver performs more hardware specific or intensive tasks such as preparing data packets for dispatch to hardware such as a physical device. Furthermore, separation of higher level protocol functions from device driver specific functions facilitates reuse of higher-level intermediate functions in link layer intermediate drivers across platforms and does not require rewriting large amounts of code across platforms.

Layering link layer intermediate drivers also facilitates the reuse of drivers. For example, a link layer intermediate driver may be linked to a plurality of data paths traversing from a transport layer to a physical device. Such linking facilitates reuse of a common driver for multiple data paths. Installation and configuration of link layer intermediate drivers as well as device drivers in a data flow path involves incorporating or supplying dependency data to an operating system component such as a registry.

Configurations of the link layer intermediate drivers may be employed to provide a plurality of paths to physical devices from a single transport driver. In such a configuration, a transport driver incorporates a single data flow path to a link layer intermediate driver which provides plural data flow paths to plural physical devices. Such a configuration may provide aggregation of bandwidth over the plurality of physical interfaces or a fault tolerant environment for re-routing data during a hardware failure.

Yet another configuration of link layer intermediate drivers provides a plurality of interfaces from a transport driver to a plurality of link layer intermediate drivers. In such a configuration, multiple virtual interfaces are exposed while employing only a single physical interface via a device driver and a physical device. Each of the virtual interfaces appears to the transport driver as separate devices when in fact the data is transceived over a single physical device.

Accordingly, it is a primary object of this invention to provide a system and method for incorporating a link layer intermediate link layer driver into at least one data flow path in a computer operating system. Yet another primary object of this invention is to provide a system and method for layering a link layer driver into one or more link layer intermediate drivers and a device driver. Another important object of the present invention is to provide a system and method to facilitate incorporation of additional functionality into a data flow path through the use of link layer intermediate drivers.

Additional objects and advantages of the invention will be set forth in the description which follows, and in part will be obvious from the description, or may be learned by practice of the invention. The objects and advantages of the invention may be realized and obtained by means of the instruments and combinations particularly pointed out in the appended claims. These and other objects and features of the present invention will become more fully apparent from the following description and the appended claims, or may be learned by practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not, therefore, to be considered to be limiting of its scope, the invention will be described and explained with additional specificity in detail through the use of the accompanying drawings in which.

DETAILED DESCRIPTION OF THE PREFERRED EMBODIMENTS

The following description of the present invention is presented by using flow diagrams to describe either the structure or the processing of an abstract interface for facilitating the layering of link layer intermediate drivers in a network protocol stack. Using the diagrams in this manner to present the invention should not be construed as limiting of its scope. The present invention contemplates both methods and systems for employing link layer intermediate drivers. The presently preferred embodiment comprise a general purpose computer. The currently disclosed system, however, can also be used with any special purpose computer or other hardware system and all should be included within its scope.

Embodiments within the scope of the present invention also include computer readable media having executable instructions. Such computer readable media can be any available media which can be accessed by a general purpose or special purpose computer. By way of example, and not limitation, such program storage means can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer or special purpose computer to perform a certain function or a group of functions.

Figure 1:
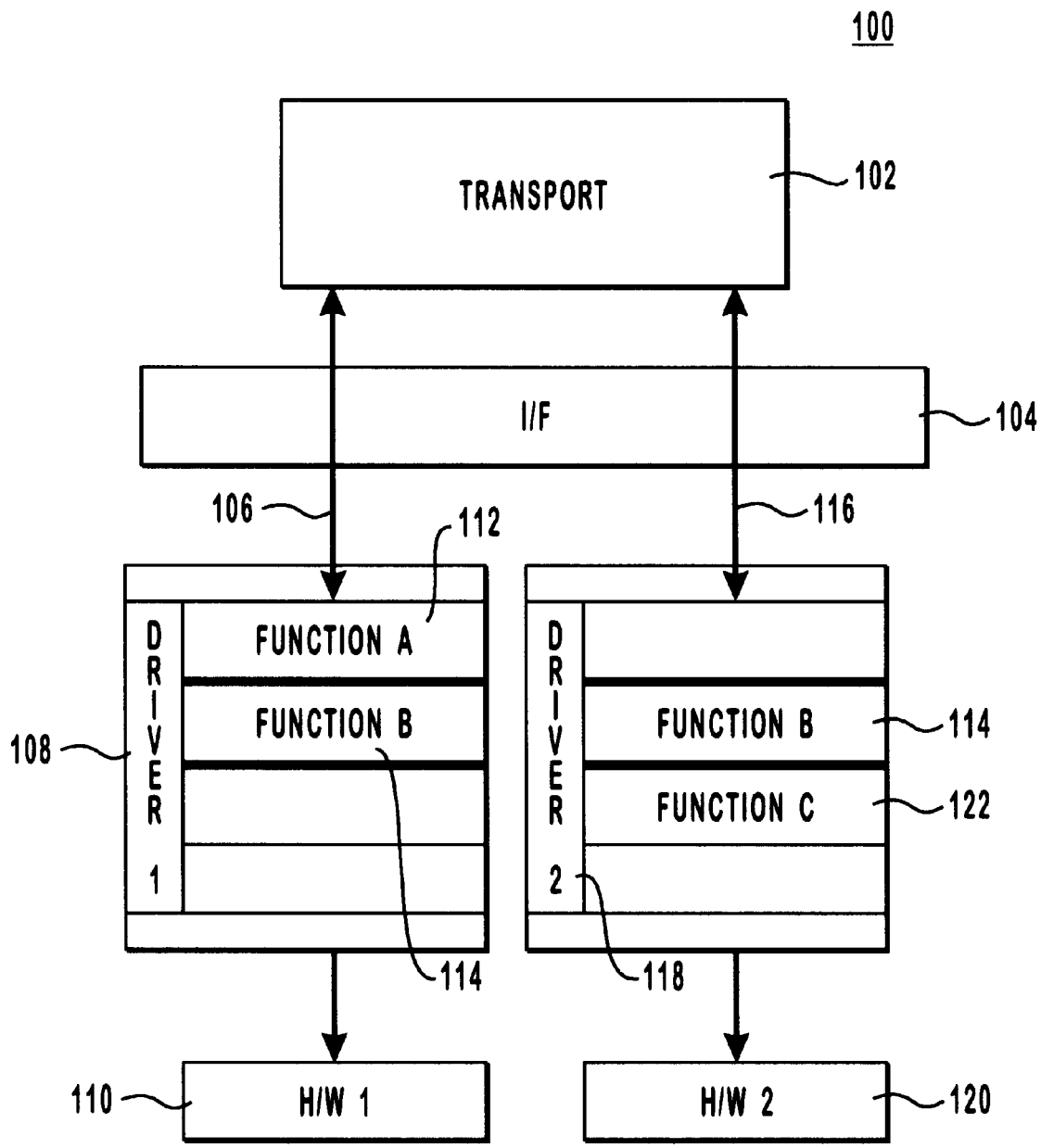
FIG. 1 is a block diagram representing a prior art configuration of a transport layer driver interconnected with link layer device drivers coupled with hardware or physical devices.
Figure 2:
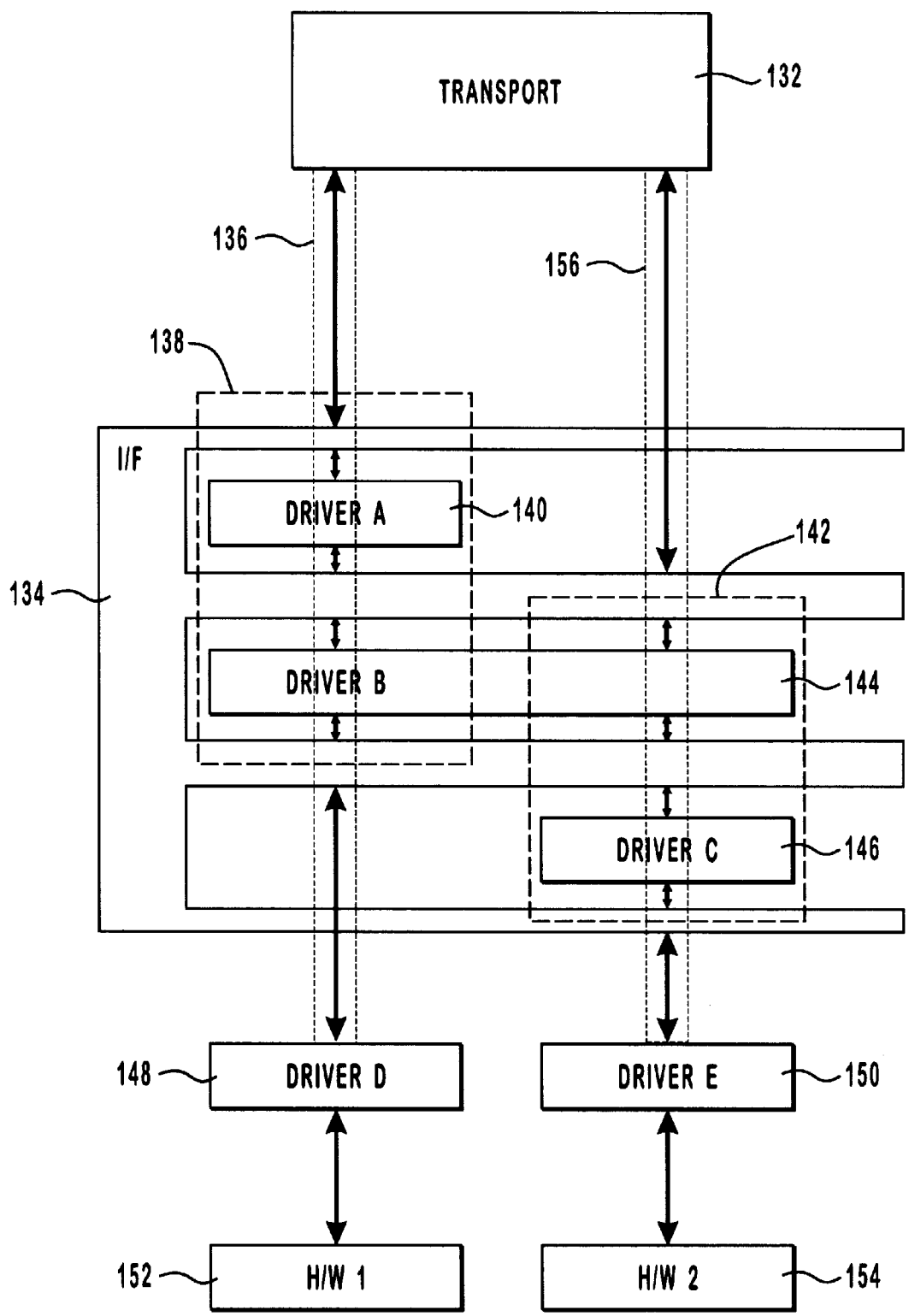
FIG. 2 is a block diagram of a network protocol stack employing an abstract interface capable of facilitating the processing of packetized data by link layer intermediate drivers, in accordance with an embodiment of the present invention.

FIG. 2 represents a simplified block diagram of a network protocol stack employing link layer intermediate drivers, in accordance with one embodiment of the present invention. A transport layer driver 132 receives data destined for dispatch across a network via hardware or physical devices such as physical devices 152 and 154. Transport layer driver 132 performs packetization and formatting of bulk data into packets compatible for transfer across a network. Transport layer driver 132 is responsible for implementing a specific network protocol such as TCP/IP or IPX/SPX. Interfacing the transport layer driver with link layer device drivers is independent of the underlying network hardware due to an intermediate interface such as an abstract interface 134.

Abstract interface 134, in one embodiment, is comprised of a function library, sometimes referred to as a wrapper, which handles many of the details involved in managing synchronous and asynchronous communications across a network. Abstract interface 134 also provides a library of functions for interfacing to the kernel mode of an operating system. Device drivers, therefore, need only perform specific required processing, such as hardware specific operations needed to manage a particular hardware or physical device. Functions within the abstract interface library incorporate functionality common to most device drivers such as synchronization, notification of packet arrival and queuing of outgoing packets. In contrast, traditional drivers perform most of the above functionality on their own which makes such device drivers much harder to write and debug and often slower than leaner drivers written to interface and operate with abstract interface 134.

Abstract interface 134 provides an interface by which one or more link layer drivers may communicate with each other. For example, a data packet may be passed into the link layer through a data flow command from a higher level such as a transport layer driver. The call or request is made into abstract interface 134 with a destination driver indicator or handle. Abstract interface 134 evaluates the handle and determines, from linking and initialization information, the routing path or data flow to be traversed by the data packet through the network protocol stack. Such linking information may be obtained during initialization or loading of drivers, as explained in greater detail below. After evaluating the handle, abstract interface 134 then calls the corresponding driver, such as link layer intermediate driver 140 which performs its inherent processing on the data packet. Link layer intermediate driver 140 then passes control back to abstract interface 134 for subsequent routing of the processed data packet. Abstract interface 134 then again consults routing or interconnection information and makes a call or alternatively passes the processed data packet to the next driver which may be another intermediate layered driver such as link layer intermediate driver 144 or a link layer device driver such as device driver 148. In the case of a link layer intermediate driver 144, the designated driver performs its inherent process on the data and returns control back to abstract interface 134 or interfaces with corresponding hardware such as physical device 152 when the designated driver was, for example, device driver 148.

It should be noted that data flow paths may also originate at a physical device with processing proceeding "up" the stack of layered drivers as well as "down" the stack of layered drivers as in the procedure described above. Abstract interface 134 further provides the capability of allowing a driver to query the interconnection and capability information within abstract interface 134 to discern configuration, statistical and capability information respecting a specific driver.

Abstract interface 134 defines a fully abstracted environment for facilitating intermediate, device and transport driver development. For example, external functions previously required by link layer intermediate and device drivers such as registering and interception of hardware interrupts, are off-loaded and performed by abstract interface 134 by employing predefined abstract functions. Therefore, link layer intermediate and device drivers may be developed entirely in a platform independent high level language such as C, and then may be easily recompiled to run on other environments or platforms employing abstract interface 134. In the preferred embodiment, abstract interface 134 is implemented as a function library which may be represented as a wrapper surrounding transport, link layer intermediate and a portion of device drivers, thereby simplifying the interaction with other operating system components. All interactions between transport, link layer intermediate and device drivers are executed as calls through abstract interface 134. In one preferred embodiment, the function library is packaged in an export library as a set of abstract functions and is incorporated as in line macros for maximum performance in the host operating system. When link layer intermediate and device drivers are installed, they link against the function library. Alternatively, interaction with abstract interface 134 may take the form of a messaging based system wherein messages are passed to abstract interface 134 for decoding and branching to the applicable operative procedures.

As discussed above, abstract interface 134 provides a fully abstracted interface to which drivers may be written. Such an interface allows device drivers to be easily ported with a simple recompilation, in many cases, to other abstract interface operating environments. Therefore, link layer intermediate and device drivers need not know detailed information such as entry points of the other's functions. Instead, each driver registers their functionality and function entry points with abstract interface 134 upon the loading of various drivers. One such example of abstract interface 134 is the Network Driver Interface Specification (NDIS) by Microsoft® incorporated into Windows NT®.

Referring again to FIG. 2, a link layer intermediate driver 140 performs an inherent process on transferred data packets when directed by a call represented by data flow path 136 through abstract interface 134 from transport layer driver 132. Link layer intermediate driver 140 is sandwiched between transport layer driver 132 and link layer intermediate driver 144. As described above, link layer intermediate driver 140 interfaces to transport layer driver 132 and link layer intermediate driver 144 through abstract interface 134. Because of the standardized abstract interface through which each link layer intermediate driver and any associated device driver communicate, such as link layer device driver 148 and transport driver 132, any number of link layer intermediate drivers may be added or deleted from the present process flow of a data packet. That is to say, grouping 138 of link layer intermediate drivers 140 and 144 may perform a specific function in data packet processing. If a particular user desires to incorporate a new driver feature, such as for example encryption, a new link layer intermediate driver may be configured within the process flow by incorporating interconnection or routing information into abstract interface 134 upon loading of the driver. That is to say, link layer intermediate drivers 140 and 144 are entirely reusable and reconfigurable because of the standard interface employed in their original design.

One such use of a link layer intermediate driver occurs in a network stack wherein an existing device driver is called upon to interface to a previously unknown media type received from a transport driver. In such a situation, a link layer intermediate driver may be designed and incorporated into a data flow path between the transport driver and the established or legacy device driver to facilitate compatibility. For example, if an established network protocol stack is subjected to a new condition or environment such as connecting an existing computer network into a wireless communication channel having additional needs such as monitoring and relaying signalling data such as signal strength or power. To incorporate this functionality into an existing single driver would require rewriting the entire single existing driver. However, the present invention enables a developer to generate a link layer intermediate driver for interfacing with the existing or legacy driver. The link layer intermediate driver then multiplexes or processes the additional data as required by the wireless channel.

In most operating systems, the term "driver" refers to a software module that manages a peripheral or physical device such as physical devices 152 and 154. Modern operating systems such as Windows NT® take a more flexible approach which permits layering or configuring link layer intermediate drivers between a link layer device driver and a transport layer driver. Such a use of a driver redefines the term into a much broader scope and may include operations such as file system management, data manipulation functions such as encryption and various network components as well as physical device drivers. In fact, the presence of a sophisticated abstract interface 134 permits a user to layer or incorporate any number of link layer intermediate drivers on top of a physical device driver 148. Such link layer intermediate drivers or layers provide a method of extending the capabilities of the I/O system without having to modify drivers at lower levels.

Link layer intermediate drivers may also be used to separate hardware specific operations from more general management issues. In such a configuration as shown in FIG. 2, link layer intermediate drivers 140 and 144 may perform more general management functions or operations while link layer device driver 148, also interfacing with abstract interface 134, performs more hardware specific or intensive tasks such as preparing data packets for dispatch to hardware such as physical device 152. Such a use of separate classes or operations of drivers makes it easier to target a wider range of hardware since only those devices interfacing with actual physical hardware need to be rewritten as physical devices change or vary from system to system. Furthermore, separation of higher level protocol functions from device driver specific functions facilitates reuse of higher-level intermediate functions of intermediate drivers across platforms and does not require rewriting large amounts of code on those platforms. For example, link layer intermediate drivers written to interface with abstract interface 134 may be ported to other operating systems and reused with minimal to no modifications. The only significant modifications occur at the device drivers that interface with different hardware components.

As alluded to above, layering also makes it possible to hide hardware limitations from users of a device or to add features not supported by the hardware itself. For example, if substituted or replaced hardware may only handle data packets of a given size, it is possible to insert a link layer intermediate driver into the data flow path that may partition oversized data into smaller compatible packets. Such modifications to the network protocol stack are transparent to the user as they are unaware of any changes in a physical device.

Additionally, the ability of inserting or removing link layer intermediate drivers or layers provides a transparent way of adding or removing features from a product without having to maintain multiple code bases for the same product. Layering link layer intermediate drivers also facilitates the reuse of drivers. For example, link layer intermediate driver 144 may be linked to a plurality of data flow paths that share or reuse shared link layer intermediate driver 144. Such a configuration is depicted by data flow 136 traversing through link layer intermediate drivers 140 and 144 as well as data flow 156 traversing through link layer intermediate drivers 144 and 146. Such linking facilitates reuse of a common driver for multiple data paths.

Installation and configuration of link layer intermediate drivers as well as device drivers in a data flow path involves incorporating or supplying dependency data to an operating system component such as a registry (not shown). In one embodiment, installing a link layer intermediate driver involves providing information necessary to set up dependency relationships among the desired drivers in the hierarchy. Such information may be kept in a registry for incorporation in a binding procedure. Typically, during a boot up procedure of a computer system, an operating system scans the registry and identifies available drivers and their dependencies. Such dependencies initially disclosed to a registry are subsequently incorporated into abstract interface 134 for data flow routing of data packets.

In the preferred embodiment, relationships between drivers can be expressed as dependencies and as bindings. A network driver has binding relationships with other drivers and dependencies on other network components or drivers. For example, a dependency expresses a relationship between components that determines the order in which those components are loaded by the operating system, while a binding relationship provides execution through the abstract interface wherein a particular driver utilizes another driver in the data flow for routing data packets. In an operating system such as Windows NT®, the binding relationships are determined by a system software component called a "binding engine." When the binding engine runs, it generates binding information for all network components in the registry. In addition, the binding engine generates dependencies for each of the components based on binding information. The binding engine writes these dependencies into the registry for referencing during the loading of dependent components.

Figure 3:
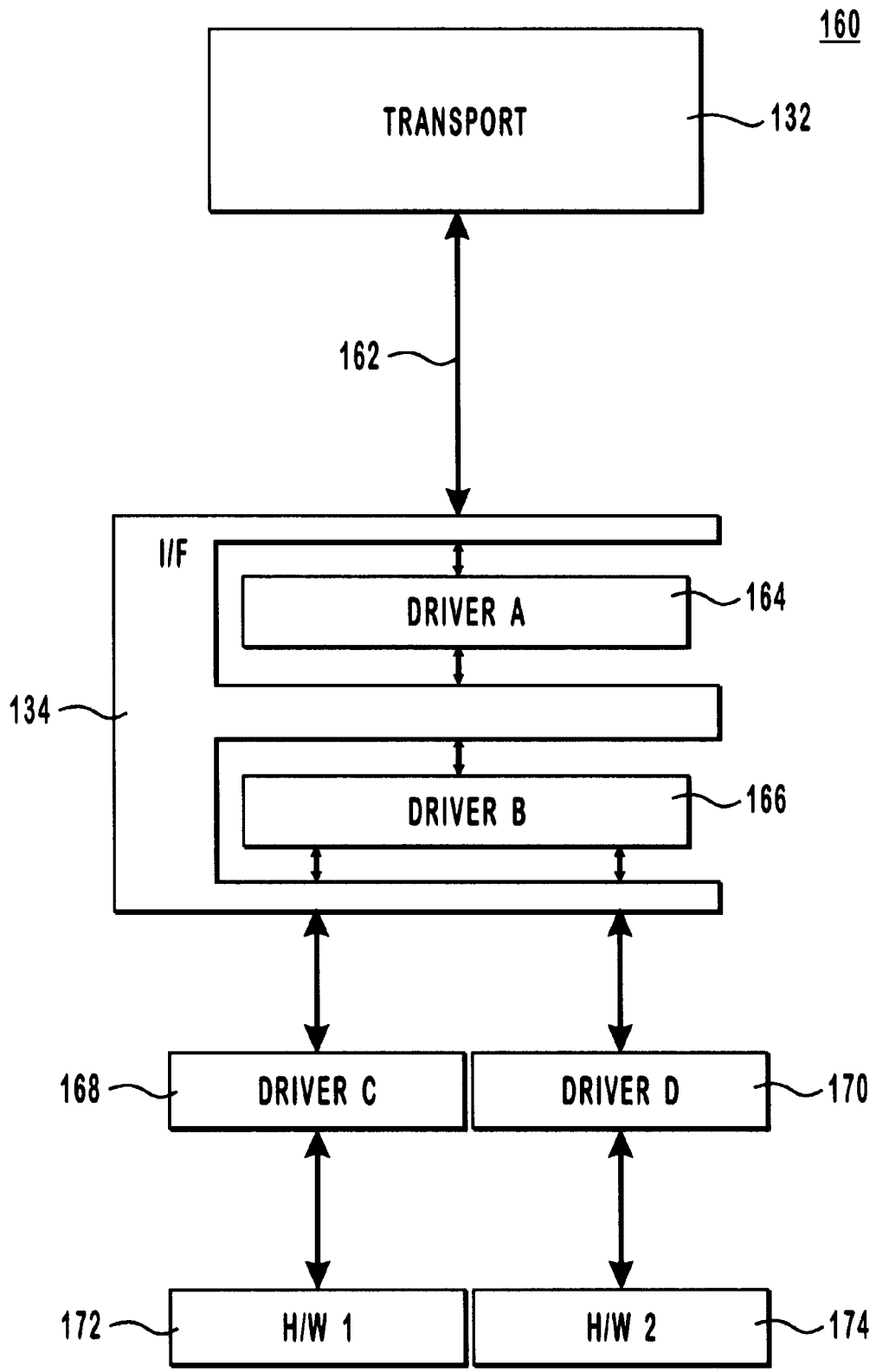
FIG. 3 is a block diagram of a network protocol stack having an abstract interface capable of interconnecting a plurality of device drivers, in accordance with another embodiment of the present invention.

FIG. 3 presents a simplified block diagram of a particular configuration of link layer intermediate drivers in accordance with another embodiment of the present invention. The present configuration provides a plurality of paths to physical devices 172 and 174 from a single transport driver 132. In the present configuration, transport driver 132 perceives a single data flow path to link layer intermediate driver 164 via path 162. Transport driver 132 issues or receives a call from abstract interface 134 directed at or received from link layer intermediate driver 164. Link layer intermediate driver 164 traverses or interfaces with link layer intermediate driver 166 via abstract interface 134. Link layer intermediate driver 166, as shown, provides dual data flow paths to physical devices 172 and 174. Such a configuration may provide aggregation of bandwidth over a plurality of physical interfaces. Such virtual interfaces presented to transport driver 132 provide a perception that the data path, in the present configuration, is twice as wide or capable as a single data path. In such a configuration, transport driver 132 does not need to be aware of the actual configuration. In addition, such a configuration may facilitate the aggregation of additional physical devices and drivers thereby providing an increased bandwidth to transport layer driver 132.

The present configuration of a plurality of physical device interfaces also may provide fault tolerant capability. That is to say, upon the detection of a failure condition in either physical device 172 or 174, link layer intermediate driver 166 may switch the routing of the data flow from the dysfunctional data path to the operable path without any perceived defect by transport layer driver 132. In such a configuration, the transport layer driver does not need to be aware of the actual configuration of the lower link layer intermediate or device drivers. Link layer intermediate driver 166 has complete control over the routing and utilization of device drivers interfacing thereto.

Figure 4:
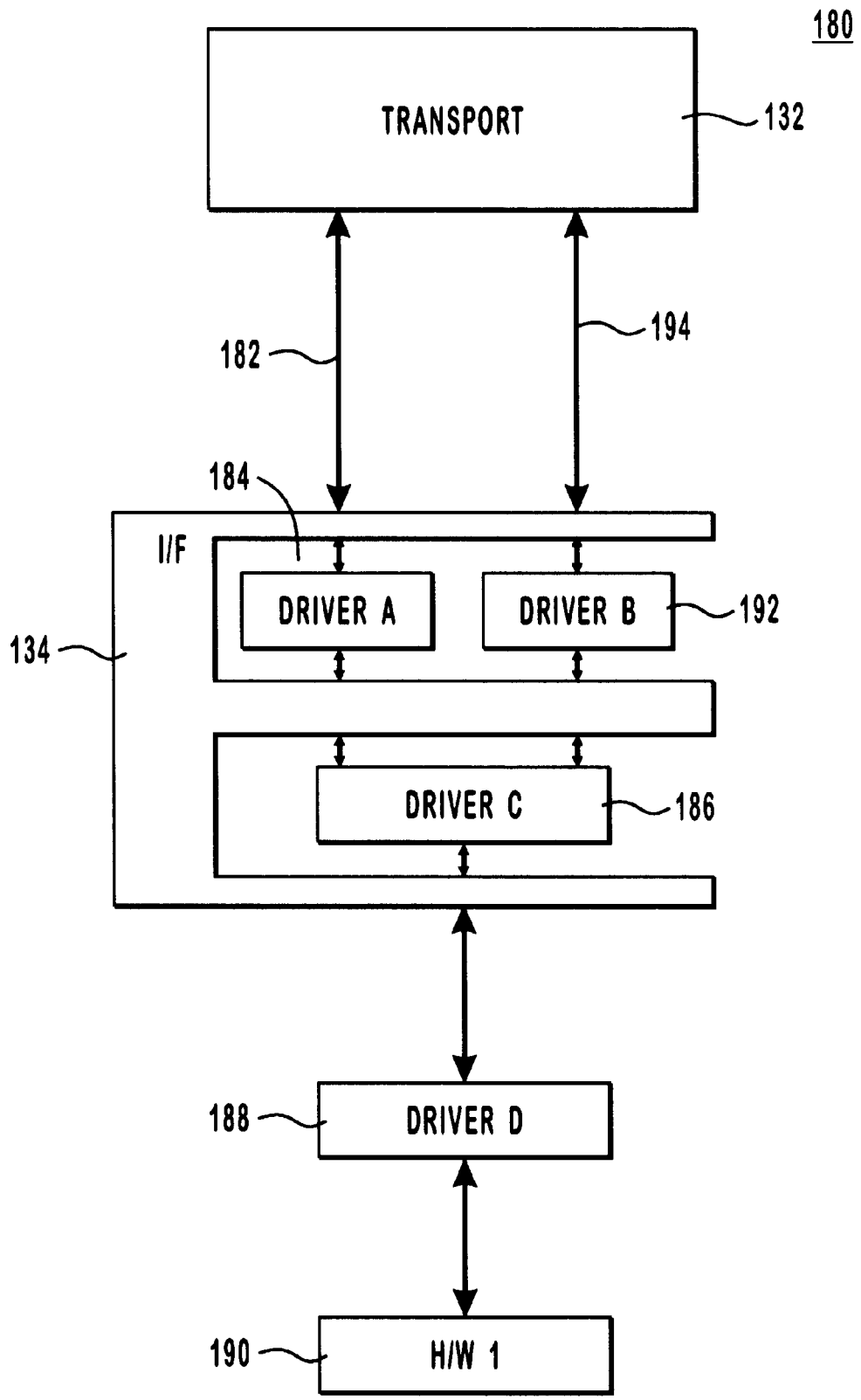
FIG. 4 is a network protocol stack having an abstract interface capable of interfacing a plurality of link layer intermediate drivers, in accordance with yet another embodiment of the present invention.

FIG. 4 is a simplified block diagram representing a configuration of link layer intermediate drivers in accordance with another embodiment of the present invention. The present configuration illustrates a transport layer driver 132 having a plurality of interfaces therefrom. Such a configuration exposes multiple virtual interfaces shown as interfaces 182 and 194, to link layer intermediate drivers 184 and 192. Outputs of link layer intermediate drivers 184 and 192 are combined by a link layer intermediate driver 186 into a single physical interface via device driver 188 and physical device 190. By presenting multiple virtual interfaces, a transport driver may implement what it believes to be a plurality of data flows. However, the actual dispatching of the data packets onto the network occurs across a single device driver and physical device. One such example of adaptation layers which expose multiple virtual interfaces over a single interface occurs in an Asynchronous Transmission Mode (ATM) Local Area Network (LAN) emulation where multiple Emulation LANs (ELAN) are exposed over a single ATM adaptor. Each of the virtual interfaces looks like a LAN adaptor to transport layer driver 132.

It should also be noted that a combination of the configuration illustrated in FIG. 3 in conjunction with the combination of the configuration illustrated in FIG. 4 may be employed to facilitate multiplexing of M inputs into N outputs. Such configurations may find use in packet sorting applications such as those used in asynchronous communication systems where packets may propagate out of order through a network or where packets originate from varying sources and have varying destinations.

Figure 5:
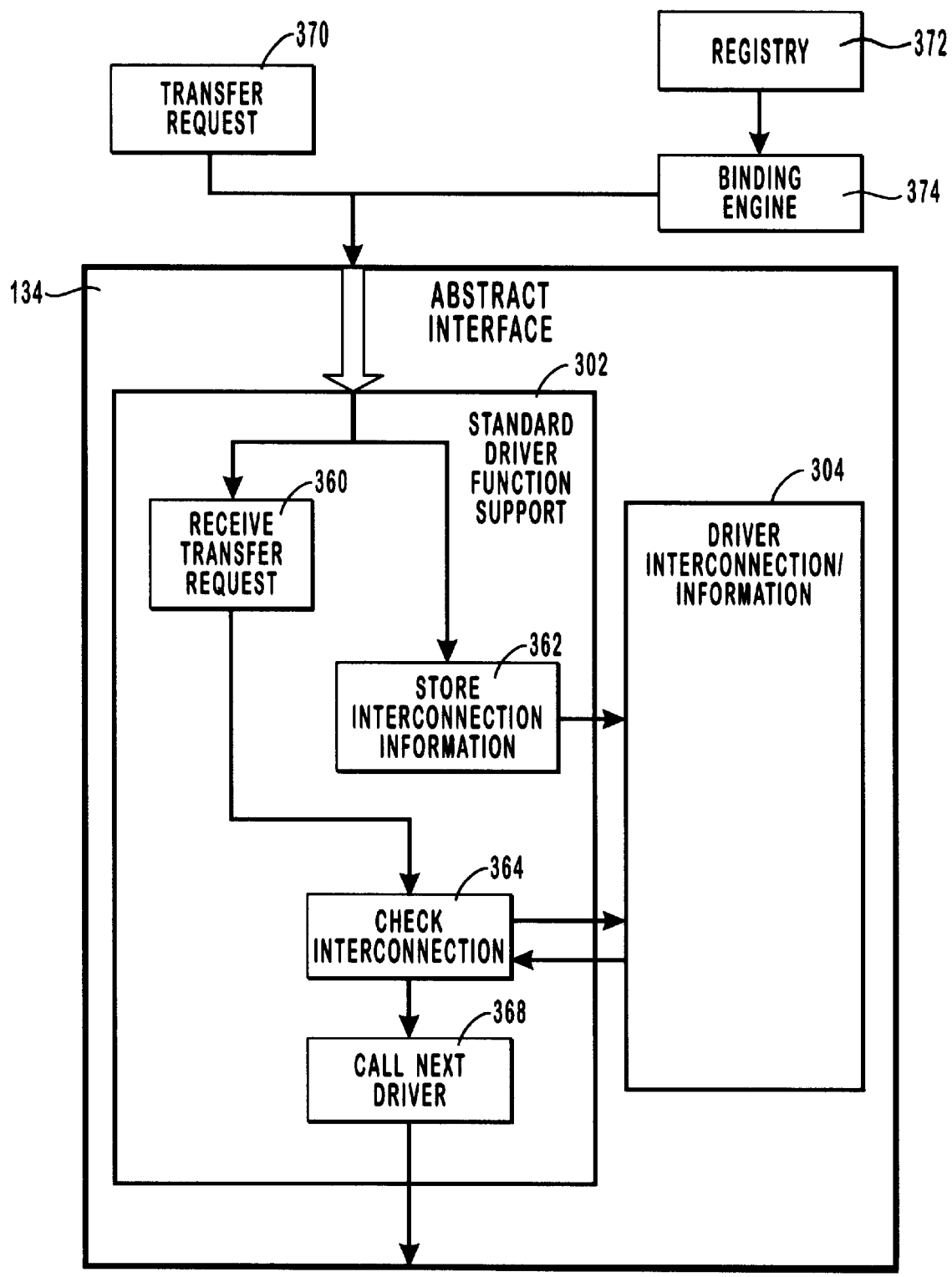
FIG. 5 is a simplified block diagram of an abstract interface, in accordance with one embodiment of the present invention.

FIG. 5 is a simplified block diagram of abstract interface 134, in accordance with one embodiment of the present invention. As alluded to above, abstract interface 134 describes the interface by which transport layer drivers, link layer device drivers and transport drivers communicate with one another and with the operating system. Abstract interface 134 comprises a standard driver function support 302 for facilitating the interfacing of transport and link layer drivers. Since standard driver function support 302 receives a transfer request 370 from transport drivers, embodiments may comprise means for receiving a receive transfer request. By way of example, in FIG. 5 such means is illustrated by receive transfer request block 360 which, in one embodiment, takes the form of a function call to the library of functions within abstract interface 134. Alternatively, means for receiving a receive request may take the form of a messaging-based interface providing message evaluation and procedure routing.

Since the receive transfer request may be comprised of a driver handle or descriptor referencing a specific data flow path, standard driver function support 302 further comprises a means for referencing or checking interconnection information as directed by the driver handle. By way of example, in FIG. 5 such means is illustrated by check interconnection block 364 which, in one embodiment, takes the form of a query to driver interconnection information 304.

Driver interconnection information, as discussed above, is comprised of interconnection or routing information that establishes the desired data flow path through various link layer intermediate drivers and a link layer device driver. Such interconnection information is generally loaded into a registry 372 contemporaneously with loading or initialization of the driver. In one embodiment, a binding engine 374 retrieves dependency information from registry 372 and process such information. Because abstract interface 134 relies on such interconnection information in making routing decisions, driver interconnection information is passed to abstract interface 134 for storage. One embodiment may comprise a means for storing interconnection information. By way of example, in FIG. 5 such means is illustrated by store interconnection information block 362 which, takes the form of a function call to the library of functions within abstract interface 134. Driver interconnection information is then stored within abstract interface 134 in driver interconnection information 304.

Driver interconnection information 304 returns the data flow routing information to standard driver function support 302 upon request. Because abstract interface 134 directs or controls the paths taken through a particular data flow, embodiments may comprise means for calling the next driver. By way of example, such means is illustrated by call next driver block 368 which takes the form of a function call to the library of functions within abstract interface 134. The designated subsequent driver is then called with directives such as pointers to data to be processed. This process is then iterated for each driver included within a specified data flow path.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer operating system capable of transferring a data packet along a data flow path from a transport layer driver to a network, a method for facilitating the transfer of the data packet from the transport layer driver to the network via a partitioned link layer device driver that includes at least one link layer intermediate driver and a lower link layer device driver, the partitioning of the link layer device driver allowing for the functionality of the link layer device driver to be adjusted by replacing a component of the link layer device driver rather than reconstructing the entire link layer device driver, said method comprising the following specific acts:

providing an abstract interface to convey said data packet from said transport layer driver to said lower link layer device driver via said at least one link layer intermediate driver; and configuring said abstract interface to receive the data packet from the transport layer driver and provide the data packet to the at least one link layer intermediate driver for further processing, the abstract interface further configured to receive the processed data packet from the at least one link layer intermediate driver, the abstract interface then providing the processed data packet to the lower link layer device driver, wherein said at least one link layer intermediate driver is incorporated into said data flow path.

2. The method for facilitating the transfer of the data packet as recited in claim 1, wherein said specific act of providing an abstract interface further comprises a specific act of providing a common interface to said abstract interface compatible with said transport layer driver, said link layer intermediate driver and said lower link layer device driver.

3. The method for facilitating the transfer of the data packet as recited in claim 2, wherein said abstract interface comprises a library of functions accessible through said common interface.

4. The method for facilitating the transfer of the data packet as recited in claim 1, wherein said specific act of configuring said abstract interface further comprises the following specific acts:

said abstract interface receiving link layer intermediate driver interconnection information upon installation of said link layer intermediate driver describing said data flow path; and referencing said link layer intermediate driver interconnection information when determining where to convey said data through said data flow path.

5. The method for facilitating the transfer of the data packet as recited in claim 4, wherein said specific act of said abstract interface receiving link layer intermediate driver interconnection information further comprises a specific act of binding said link layer intermediate driver interconnection information into said abstract interface for use in said specific act of referencing said link layer intermediate driver interconnection information.

6. The method for facilitating the transfer of the data packet as recited in claim 1, wherein said link layer intermediate driver is further incorporated into a second data flow path.

7. The method for facilitating the transfer of the data packet as recited in claim 1, further comprising the following specific acts:

routing said data packet from said abstract interface to said link layer intermediate driver for processing into said processed data packet;

receiving said processed data packet at said abstract interface from said link layer intermediate driver; and routing said processed data to said lower link layer device driver according to said driver interconnection information.

8. The method for facilitating the transfer of the data packet as recited in claim 1, further comprising a specific act of porting said link layer intermediate driver into a second data flow path of a second operating system comprised of said abstract interface.

9. The method for facilitating the transfer of the data packet as recited in claim 4, wherein said specific act of receiving link layer intermediate driver interconnection information further comprises the following specific acts:

establishing dependency relationships between said link layer intermediate driver and said lower link layer device driver; and storing said dependency relationships for access by said operating system upon initialization.

10. In a computer operating system capable of transferring data along a data flow path to a first physical device, a method for facilitating the transfer of the data to the first physical device via a partitioned link layer device driver that includes at least one link layer intermediate driver and a lower link layer device driver, the partitioning of the link layer device driver allowing for the functionality of the link layer device driver to be adjusted by replacing a component of the link layer device driver rather than reconstructing the entire link layer device driver, said method comprising the following specific acts:

providing an abstract interface to said operating system to convey the data to said lower link layer device driver via said at least one link layer intermediate driver;

configuring said abstract interface to route the data through the at least one link layer intermediate driver prior to being provided to the lower link layer device driver.

11. The method for facilitating the transfer of the data as recited in claim 10, wherein said link layer device driver may be re-used from another computer operating system.

12. The method for facilitating the transfer of the data as recited in claim 10, further comprising the following specific acts:

partitioning said link layer device driver into said at least one link layer intermediate driver, the link layer intermediate having an input and output interface compatible with said abstract interface and said lower link layer device driver having an input interface compatible with said abstract interface and an output interface for operatively coupling with said first physical device; and providing operative interconnection from said operating system to said first physical device by providing operative interconnection from said operating system to said lower link layer device driver via said at least one link layer intermediate driver coupled to said lower link layer device driver via said abstract interface.

13. The method for facilitating the transfer of the data as recited in claim 12, wherein said specific act of providing operative interconnection comprises the following specific acts:

storing driver interconnection information of said operative interconnection of said at least one link layer intermediate driver and said lower link layer device driver; and referencing said driver interconnection information of said operative interconnection to establish an order of said at least one link layer intermediate driver and said lower link layer device driver.

14. The method for facilitating the transfer of the data as recited in claim 12 wherein said specific act of providing operative interconnection further comprises a specific act of providing operative interconnection of said at least one link layer intermediate driver with a second physical device driver operably coupled to a second physical device.

15. The method for facilitating the transfer of the data as recited in claim 14, further comprising a specific act of selectively switching from said first physical device driver to said second physical device driver when said operating system detects a fault condition with said first physical device.

16. The method for facilitating the transfer of the data as recited in claim 12, wherein said specific act of partitioning comprises the following specific acts:

partitioning said link layer device driver into at least a first and a second link layer intermediate driver having a first and second input and a first and second output interface compatible with said abstract interface;

providing a third link layer intermediate driver having a third input interface compatible with said abstract interface and an output interface for operatively coupling with said first physical device; and said third link layer intermediate driver multiplexing said first and second outputs of said first and second intermediate drivers coupled to said third input of said third link layer intermediate driver via said abstract interface.

17. The method for facilitating the transfer of the data as recited in claim 16, wherein said specific act of partitioning said first link layer device driver into at least a first and a second intermediate driver further comprises a specific act of presenting to said operating system at least two virtual interfaces to said first physical device.

18. The method for facilitating the transfer of the data as recited in claim 17 wherein said specific act of presenting further comprises a specific act of providing aggregated bandwidth to said operating system via said at least two virtual interfaces.

19. A computer-readable medium for use in a computer operating system capable of transferring a data packet along a data flow path from a transport layer driver to a network, the computer-readable medium containing computer-executable instructions for implementing a method for facilitating the transfer of the data packet from the transport layer driver to the network via a partitioned link layer device driver that includes at least one link layer intermediate driver and a lower link layer device driver, the partitioning of the link layer device driver allowing for the functionality of the link layer device driver to be adjusted by replacing a component of the link layer device driver rather than reconstructing the entire link layer device driver, said computer-readable medium having computer-executable instructions for performing the following specific acts:

providing an abstract interface to convey said data packet from said transport layer driver to said lower link layer device driver via said at least one link layer intermediate driver; and configuring said abstract interface to receive the data packet from the transport layer driver and provide the data packet to the at least one link layer intermediate driver for further processing, the abstract interface further configured to receive the processed data packet from the at least one link layer intermediate driver, the abstract interface then providing the processed data packet to the lower link layer device driver, wherein said at least one link layer intermediate driver is incorporated into said data flow path.

20. The computer-readable medium as recited in claim 19, wherein said computer-executable instructions for providing an abstract interface further comprises computer-executable instructions for performing a specific act of providing a common interface to said abstract interface compatible with said transport layer driver, said link layer intermediate driver and said lower link layer device driver.

21. The computer-readable medium as recited in claim 20 further comprising computer-executable instructions for accessing a library of functions through said common interface forming said abstract interface.

22. The computer-readable medium as recited in claim 19, wherein said computer-executable instructions for configuring said abstract interface further comprises computer-executable instructions for performing the following specific acts:

said abstract interface receiving link layer intermediate driver interconnection information upon installation of said link layer intermediate driver describing said data flow path; and referencing said link layer intermediate driver interconnection information when determining where to convey said data through said data flow path.

23. The computer-readable medium as recited in claim 22, wherein said computer-executable instructions for receiving link layer intermediate driver interconnection information further comprise computer-executable instructions for performing a specific act of binding said link layer intermediate driver interconnection information into said abstract interface for use in said specific act of referencing.

24. The computer-readable medium as recited in claim 19 having computer-executable instructions for incorporating a second data flow path incorporating said link layer intermediate driver therein.

* * * * *

UNITED STATES PATENT AND TRADEMARK OFFICE
CERTIFICATE OF CORRECTION

PATENT NO. : 6,233,624 B1
DATED : May 15, 2001
INVENTOR(S) : Jameel Hyder and Kyle Brandon It is certified that error appears in the above-identified patent and that said Letters Patent is hereby corrected as shown below:

<u>Column 5,</u>
Line 29, after "embodiment" change "comprise" to -- comprises --

<u>Column 10,</u>
Line 59, before "such" change "process" to -- processes --

<u>Column 11,</u>
Line 18, after "only as" change "illustrated" to -- illustrative --

<u>Column 14,</u>
Line 44, after "further" change "comprises" to -- comprise --

Signed and Sealed this

Seventh Day of May, 2002

*Attest:*

JAMES E. ROGAN
*Attesting Officer*     *Director of the United States Patent and Trademark Office*